US009161417B2

(12) United States Patent
Pandharipande et al.

(10) Patent No.: US 9,161,417 B2
(45) Date of Patent: Oct. 13, 2015

(54) CONFIGURATION UNIT AND METHOD FOR CONFIGURING A PRESENCE DETECTION SENSOR

(75) Inventors: Ashish Vijay Pandharipande, Eindhoven (NL); David Ricardo Caicedo Fernandez, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 382 days.

(21) Appl. No.: 13/700,941

(22) PCT Filed: May 30, 2011

(86) PCT No.: PCT/IB2011/052358
§ 371 (c)(1),
(2), (4) Date: Nov. 29, 2012

(87) PCT Pub. No.: WO2011/151772
PCT Pub. Date: Dec. 8, 2011

(65) Prior Publication Data
US 2013/0063046 A1 Mar. 14, 2013

(30) Foreign Application Priority Data

Jun. 3, 2010 (EP) .................................. 10164830
Oct. 28, 2010 (EP) .................................. 10189164

(51) Int. Cl.
G05F 1/00 (2006.01)
H05B 37/02 (2006.01)
H05B 39/04 (2006.01)
H05B 41/00 (2006.01)
G05B 13/02 (2006.01)

(52) U.S. Cl.
CPC ............ *H05B 37/02* (2013.01); *G05B 13/0205* (2013.01); *H05B 37/0227* (2013.01); *Y02B 20/44* (2013.01)

(58) Field of Classification Search
CPC ........... H05B 33/0815; H05B 33/0827; H05B 37/029; H05B 33/0818; H05B 33/0851
USPC .................................... 315/297; 340/541, 656
See application file for complete search history.

(56) References Cited

U.S. PATENT DOCUMENTS

| | | | | |
|---|---|---|---|---|
| RE37,135 | E * | 4/2001 | Elwell | 315/154 |
| 7,619,366 | B2 * | 11/2009 | Diederiks | 315/149 |
| 2004/0141633 | A1 * | 7/2004 | Horie | 382/103 |
| 2008/0129546 | A1 * | 6/2008 | Manor | 340/936 |
| 2010/0102962 | A1 * | 4/2010 | Hick | 340/541 |
| 2012/0019168 | A1 * | 1/2012 | Noda et al. | 315/307 |

FOREIGN PATENT DOCUMENTS

| | | | |
|---|---|---|---|
| EP | 0681413 | A2 | 5/1995 |
| EP | 1158840 | A1 | 11/2001 |
| JP | 09287913 | A | 11/1997 |
| JP | 2006244777 | A | 9/2006 |
| WO | 9625021 | A1 | 8/1996 |

* cited by examiner

*Primary Examiner* — Quan Tra
(74) *Attorney, Agent, or Firm* — Meenakshy Chakravorty

(57) ABSTRACT

A configuration unit (1) and a method for configuring a sensor (2) comprising a transmitter (4) and a plurality of receivers (6) are provided. The configuration unit is operatively connected to the transmitter and the plurality of receivers, and is adapted to estimate the location of a static element (8) based on a probing signal (5) transmitted by the transmitter and based on a return signal (7) received by the plurality of receivers. The return signal is generated by reflection of the probing signal against the static element. Moreover, the configuration unit is adapted to configure the sensor, for presence detection of a target (9), based on the estimated location of the static element.

13 Claims, 3 Drawing Sheets

CONFIGURATION UNIT AND METHOD FOR CONFIGURING A PRESENCE DETECTION SENSOR

FIELD OF THE INVENTION

The present invention relates to a configuration unit, a method and a computer program product for configuring a presence detection sensor.

BACKGROUND OF THE INVENTION

The use of artificial lighting to achieve practical or aesthetic effects is continuously increasing. Both for indoor and outdoor applications, there are numerous examples of lighting systems including e.g. light bulbs, LEDs, and spot lights for offices, restaurants, museums, advertising boards, homes, shops, shop windows, and so on.

Whatever the light source may be, however, there is a wish to save energy. For this purpose, presence detection sensor solutions may form a central role in realizing energy-efficient lighting systems, wherein the sensors may provide information on e.g. locations of a person, person movement trajectories and/or the number of persons in e.g. a room. This information may be transferred to a lighting control system controlling a lighting function of a light source, such that more or less light may be provided at the predicted location of the person. For example, if a person is estimated to be present at a specific location in a room, a light source may be turned on such that light is provided at that specific location of the room. This location may be close to e.g. a desk, a book shelf, or a chair, where the person is predicted to be located, and the control of the light source may improve the lighting for the person who e.g. will study at the desk, find a book in the shelf, or sit down in the chair to read.

However, current presence detection sensors are often associated with cumbersome and/or difficult installation procedures for changing the settings of the sensors. Thus, there is a need for new devices and methods providing a more convenient and/or effective sensor configuration.

SUMMARY OF THE INVENTION

It is an object of the present invention to mitigate the above problems and to provide a configuration unit that provides an improved configuration of a presence detection sensor.

This and other objects are achieved by providing a configuration unit and a method having the features defined in the independent claims. Preferred embodiments are defined in the dependent claims.

Hence, according to a first aspect of the present invention, there is provided a configuration unit for configuring a sensor comprising a transmitter and a plurality of receivers. The configuration unit is operatively connected to the transmitter and the plurality of receivers, and is adapted to estimate the location of a static element based on a probing signal transmitted by the transmitter and based on a return signal received by the plurality of receivers. The return signal is generated by reflection of the probing signal against the static element. Moreover, the configuration unit is adapted to configure the sensor, for presence detection of a target, based on the estimated location of the static element.

According to a second aspect of the present invention, there is provided a method for configuring a sensor. The method comprises the steps of transmitting a probing signal and receiving a return signal being generated by reflection of the probing signal against a static element. Furthermore, the method comprises the step of estimating the location of the static element based on the return signal. Moreover, the method comprises the step of configuring the sensor, for presence detection of a target, in accordance with the estimated location of the static element.

According to a third aspect of the present invention, there is provided a computer program product, loadable into a sensor for presence detection of a target, comprising software code portions for causing a processing means of the sensor to perform the steps of the method according to the second aspect of the present invention. In particular, the processing means is configured to perform the steps of transmitting, receiving, estimating and configuring.

Thus, the present invention is based on the idea of providing a configuration unit or a method being adapted to estimate the location of a static element by transmitting a probing signal and receiving at least one return signal in response to the probing signal. The probing signal may be sent by the transmitter and the return signal may be received by the plurality of receivers of the sensor to be configured. The configuration unit is adapted to estimate the presence and the position of a static element. Indeed, although the sensor itself is intended to detect moving objects like a person, the transmitter and the plurality of receivers may be used to detect the presence of static elements (in particular their locations) for configuration of the sensor. Based on the estimated location of the static element, the configuration unit is adapted to configure the sensor for presence detection of a target (during a subsequent measuring session). The present invention is advantageous in that it provides an automatic configuration, adjustment and/or tuning of the presence detection sensor. In the prior art, the parameters, such as the transmit range, of presence detection sensors are adjusted manually, e.g. by changing the orientation of the sensors thereby changing the detection region. However, such manual operation for adjusting the sensor settings is often cumbersome, circumstantial, and/or difficult. The configuration unit and the method of the present invention are advantageous in that they alleviate the problems related to manual sensor adjustments. The configuration unit and the method of the present invention provide a more convenient configuration of the presence detection sensor.

It will be appreciated that the inventors have realized that a sensor comprising a transmitter and a plurality of receivers may be able to perform an auto-configuration on its own in accordance with the method of the second aspect of the present invention. In particular, the inventors have realized that the sensor itself may determine the presence of static elements in its vicinity and thereby may configure itself relative to these static elements. For this purpose, the transmitter of the sensor may transmit a probing signal and the plurality of receivers may receive at least one return signal generated by reflection of the probing signal against such static elements. The configuration unit may be an integrated part of the sensor or a separate entity.

In addition, the present invention is advantageous in that it provides a more reliable configuration than a manual adjustment since the configuration is based on the estimated (or detected) location of static element(s) obtained by analysis of signals received by a plurality of receivers.

In the present invention, static elements (i.e. stationary objects which may be pieces of furniture such as book shelves, desks and/or chairs in indoor applications) are estimated to be present at specific locations (in e.g. a room) and the configuration unit may then configure the sensor with respect to the estimated location or locations of these static elements.

Furthermore, using the estimated locations of the static elements, a mapping of the environment, e.g. a room, may be provided. The configuration unit may then configure the sensor with respect to this mapping of static elements, thereby adjusting a detection range of the sensor to areas of the room wherein a target is likely to move within the room.

Another advantage of the present invention is that the configuration provided by the inventive configuration unit and/or the inventive method reduces the energy consumption of the presence detection sensor as compared to other prior art systems. Based on the estimated location(s) of static element(s), the configuration unit may configure the sensor such that areas in which static elements have been detected are not searched or scanned by the sensor during an operation session (i.e. when the sensor is intended to detect a moving target like a person, also referred to as a measurement session in the following), thereby limiting the coverage area of the sensor. For example, if the distance or space between two static elements, such as a book shelf close to e.g. a wall, is estimated to be relatively small (e.g. less than a predetermined threshold), the configuration unit may then configure the sensor to limit the number of measurements, or possibly turn off the transmitted power from the transmitter, for the zone comprising the static elements and the space between these two static elements (e.g. a zone comprising the book shelf and/or a possible small space between the shelf and the wall), as the probability of a target, such as a person, being present in the mentioned zone, may be rather small.

The configuration unit comprises a transmitter and a plurality of receivers, and the configuration unit is operatively connected to the transmitter and the plurality of receivers. By "operatively connected", it is here meant that the transmitter and the plurality of receivers may transmit information to the configuration unit, and vice versa. For example, the plurality of receivers may transmit signals to the configuration unit which may be processed by the configuration unit to e.g. estimate the location of a static element. Furthermore, the configuration unit may transmit signals to the transmitter e.g. to start a configuration session or, later on (before a measurement or operation session), to configure some parameters (such as the transmitting power and/or the angle of transmitting direction) of the transmitter.

The configuration unit is adapted to estimate the location of a static element based on a probing signal transmitted by the transmitter and based on a return signal received by the plurality of receivers, wherein the return signal is generated by reflection of the probing signal against a static element. Thus, if a static element is present in a region in which a probing signal emitted from the transmitter propagates, the static element may reflect the probing signal or at least part of it, thereby creating a return signal. Such a return signal may then be received by the plurality of receivers (thereby generating a plurality of electrical signals to be subsequently analyzed). By the term "static element", it is here meant an object which is stationary, i.e. does not move, wherein an example may be a piece of furniture in a room. For outdoor applications, the term "static element" may e.g. be a tree, a house and/or a rock.

The configuration unit is adapted to configure the sensor, for presence detection of a target (i.e. for a measurement session), based on the estimated location of the static element. By the term "target", it is here meant an object which moves, such as a person walking in a room. However, a person sitting in a chair may also fall under the expression "target", as the person, although sitting still during a certain period of time, may eventually move from the chair. The term "configure" may here be construed as adjust, adapt, tune, control, and/or regulate parameters of the sensor such that the sensor is configured for presence detection of a target for a particular environment. In the present invention, it will appreciated that the steps of transmitting, receiving, estimating and configuring are part of a configuration process or configuration session which takes place before a measurement session (or operation session) carried out by the sensor.

According to an embodiment of the present invention, the configuration unit may be adapted to configure the sensor by determining the direction of the probing signal or a transmitting range of the transmitter. The present embodiment is advantageous in that the configuration unit may configure the sensor for a particular direction or set of particular directions of the probing signal adapted to the location(s) of any detected static element(s), thereby providing an effective measurement session. The term "transmitting range" may be construed as a region or zone in which the probing signal is able to propagate from the transmitter during a measurement session. For example, a region or zone behind a static element may not be accessible for the probing signal, as the target and/or static element may cast a "shadow" behind the static element. In such a case, the probing signal cannot propagate, or at least cannot propagate properly, in this zone or region, and the configuration unit may then configure the sensor such that this specific region does not form part of the transmitting range. Alternatively, the "transmitting range" may be interpreted as a region or zone which is scanned by the probing signal. The configuration unit may then determine such a transmitting range based on the locations of any static elements.

For example, based on the estimated location of a static element, the configuration unit may configure the sensor such that the direction of the probing signal is adjusted to cover a first region or a second region. In other words, based on the estimated location(s) of the static element(s), the configuration unit may configure the sensor such that advantageous probing directions are selected. Indeed, if a static element, e.g. a book shelf, is located in a close vicinity to the sensor, the book shelf may block the probing signal in that direction and/or range. Thus, such a direction and/or range may be discarded and the configuration unit may configure the sensor accordingly. In this manner, the sensor may avoid, or at least reduce the risk of, transmitting signals into directions or within a region for which the probing signal may be blocked.

Another advantage with the present embodiment is that adaptation of the direction of the probing signal or a transmitting range of the transmitter increases the versatility of the sensor. For example, a possibility of a horizontal and/or vertical rotation of the transmitter may result in improved conditions for a subsequent measurement session with the sensor.

Another advantage of the direction determination is that the direction of the probing signal or a transmitting range of the transmitter may be changed towards directions and/or transmitting ranges wherein the possibility of presence detection of a target is increased.

According to an embodiment of the present invention, the configuration unit may be adapted to configure the sensor by determining the transmitting power of the probing signal, which is advantageous in that the transmitting power of the probing signal during a measurement session of the sensor is adapted to the location(s) of the static element(s). Thus, the present embodiment is advantageous with respect to power consumption. Further, the present embodiment provides a more effective detection by the sensor during a measurement session.

The present embodiment may also have the further advantage that the configuration unit may configure the transmitting power of the sensor with respect to directions and/or transmitting ranges of the transmitter already determined (as mentioned in the preceding embodiments) based on the location(s) of any static elements, wherein certain directions/ranges may be of higher interest concerning presence detection of a target. For example, if a first direction is considered to have a lower priority as compared to a second direction, the transmitting power may be reduced or even extinct in that direction, such that priority is given to the second direction. For example, the configuration unit may be adapted to reduce the transmitting power of the sensor in a direction for which the probing signal is blocked by e.g. a shelf.

According to an embodiment, the configuration unit may be adapted to configure the sensor by both determining the direction and the transmitting power of the probing signal (or transmitting range of the transmitter), which improves the efficiency of the presence detection sensor even further. For example, a direction of a probing signal or a transmitting range with a high transmitting power towards a static element which "shadows" a large area behind it may not be efficient with respect to presence detection of a target. Thus, the configuration unit may instead, in the present embodiment, adjust both the direction and the power of the probing signal (or transmitting range of the transmitter), such that either another probing direction or a lower transmitting power in that direction is applied, thereby providing a more efficient presence detection sensor.

According to an embodiment of the present invention, the configuration unit may be adapted to configure the sensor by determining boundaries of a zone defined by the estimated locations of a number of static elements. The present embodiment is advantageous in that the configuration unit determines an operation zone of the sensor, thereby improving the reliability and/or detection efficiency of the sensor. In particular, the detection region (or the transmitting range) of the sensor may be adapted to the determined zone, thereby reducing the risk of false alarm by the sensor during a measurement session outside the determined zone. In other words, the sensor may be configured with respect to dimensions of a space, wherein the dimensions are provided as detection limits for the sensor. By the term "zone", it is here meant an area within e.g. a room, or the room itself. For example, in case that the zone is a room, the static elements may represent e.g. walls of that room, and the walls may constitute the boundaries of the zone. For example, if the static elements defining the zone for detection are windows and walls (i.e. limited to a room), the present embodiment is advantageous in that the risk of presence detection of a person walking outside the room and/or an object passing by a window of the room is reduced.

According to an embodiment of the present invention, the configuration unit may be adapted to determine the size of the zone for configuring the transmitting range of the transmitter. An advantage with the present embodiment is that the configuration unit further improves the energy-efficiency of the presence detection sensor. For example, by determining the size of a zone such as a room, the sensor may be configured for presence detection of a target limited to the room. More specifically, the configuration unit may configure the sensor to exclude an area which, in principle, could be within the transmitting range of the transmitter such as an area outside the room, attainable e.g. by an open door and/or a window. Hence, if the purpose of the sensor is presence detection of a target in a room, and not outside the room, the configuration unit provides a more energy-efficient presence detection by limiting the presence detection to the room. For example, the detection range may be limited by controlling, via e.g. software means, the pulse repetition time, or the time interval between transmission, of two pulses from the transmitter. As a result, a limited number of directions will be scanned by the transmitter during a measurement session.

Generally, the configuration unit may be adapted to configure the sensor for different environments, e.g. for indoor and/or outdoor applications. For this purpose, the configuration unit may be equipped with receiving means for receiving information indicating the type of environment for which the configuration is to be performed. The configuration unit may therefore know in advance that the configuration of the sensor is intended for use of the sensor in a room, a corridor, an entire floor of a building, a street, a school yard or any other types of environments. With such information, the configuration of the sensor is rendered more effective and thereby even further improved. In its simplest form, instead of a very specific environment, the configuration unit may be equipped with receiving means for receiving information indicating whether the sensor is to be used for indoor or outdoor applications. Alternatively, the configuration unit may identify itself, from the detected location(s) of static element(s), for which kind of environment the sensor is intended to be used. For this purpose, the configuration unit may be equipped with a look up table including e.g. reference maps to which the detected location(s) of static element(s) can be compared. The configuration may then be performed in accordance with the identified environment in which the sensor is to operate.

Another example may be the case of determining the size of a zone within a room comprising one or more static elements, e.g. one or more of a book shelf, a sofa and/or a desk. Here, the configuration unit may be adapted to determine the size of the zone (or sizes of the zones) and thereby adjust the transmitting range of the transmitter with respect to the size of the zone and the estimated locations of the static elements. Furthermore, the configuration unit may be adapted to determine the zone size or sizes with respect to the feasibility and/or probability of a presence detection of a target in that zone or zones.

According to an embodiment of the present invention, the configuration unit may be adapted to configure the sensor by determining a threshold for a return signal to be obtained during a measurement session by the sensor based on noise levels measured in the return signal (obtained during a configuration session). The present embodiment provides the advantage of improving even further the presence detection made by the sensor during a measurement session. Based on the thresholds, the configuration unit determines whether there is a static element present in the direction of the corresponding probing signal or transmitting range.

According to an embodiment of the present invention, the configuration unit may be adapted to estimate the location of the static element based on the time-of-flight of the probing signal and the return signal. By the term "time-of-flight", it is here meant a measurement of the time that it takes for the probing signal and the return signal to travel a distance to the target, and back from the target, respectively. During the configuration session, a return signal obtained in response to a single transmit pulse may be processed, wherein the time duration between emission of the transmit pulse and reception of a return signal in response of the transmit pulse is measured. As a result, the distance between the transmitter and the static element may be calculated based on the measured duration. Hence, a return signal generated by reflection of a probing signal against a static element may be processed, such that the position of a static element may be determined in terms of distance between the transmitter and the static element.

According to an embodiment of the present invention, the configuration unit may be adapted to determine the presence of a static element by subtracting two return signals obtained in response to two consecutive similar pulses transmitted from the transmitter. In the present embodiment, return signals obtained in response to two consecutive transmit pulses may be subtracted. As the return signal from a static element is not time-varying (because the static elements are stationary, i.e. not moving), its contribution to the difference of two return signals obtained in response to two consecutive transmit pulses or two similar transmit pulses (same direction and power) is zero, or at least negligible. The present embodiment is advantageous in that it facilitates distinction of static elements from targets. Alternatively, other filtering operation may be performed to distinguish static elements in the return signals, and in particular to distinguish static elements from targets.

According to an embodiment of the present invention, the configuration unit may comprise receiving means for receiving information relating to the location of a device operatively connected to the sensor, the configuration unit being adapted to configure the sensor for relative localization of a target with respect to the device using the information. By the term "receiving means", it is here meant any means for receiving information, such as one or more receivers. By the term "device", it is here meant a device which may be provided indoors or outdoors, such as a light source, a heater, a ventilation, an air-conditioning system, or any combination thereof. For example, information relating to the position of a device may be a commissioning plan, or the like. It may be a map of the positions of the devices (e.g. light sources) distributed in a room or on a floor of a building. Further, the device is operatively connected to the sensor, meaning that the device may receive information from the sensor (and possibly vice versa). The device may receive signals from the sensor relating to the position of a target e.g. in a room or may receive signals indicating that the device (e.g. a light source) is to be activated. In general, the sensor may transmit information relating to the operation of the device, e.g. an increase/decrease of light of the light source, an increase/decrease of heat of the heater, etc. Further, in the present embodiment, the configuration unit is adapted to configure the sensor for relative localization of a target with respect to the device, which, for example, may include parameters for transformation of a measured distance from the sensor to the target into a distance from the device to the target.

An advantage of the present embodiment is that the configuration unit improves energy efficiency for a system comprising a plurality of devices and a sensor configured by the configuration unit in that the device may only be activated when the sensor detects presence of a target at a position (or location) corresponding to the position of the device. For example, a device such as a light source may be operated such that more or less light is provided as a function of the location of a target with respect to the light source. It will be appreciated that the sensor may be connected to a plurality of devices and thus that the received information may relate to the positions of a plurality of devices, such as a plurality of light sources arranged at different locations, e.g. in the ceiling of a room.

According to an embodiment of the present invention, the configuration unit may be adapted to determine if the sensor is inactive with respect to presence detection of a target for initiating estimation of the location of the static element. Hence, the configuration unit may be adapted to determine, for initiating estimation of the location of the static element, if the sensor is active, or turned "on", for detection of a target such as a person, or if the sensor is inactive, or turned "off", for target detection. In other words, the configuration unit may be adapted to determine whether the sensor is performing a measurement session. If the sensor is inactive with respect to presence detection of a target, the configuration unit may initiate estimation of the location of a static element for configuration of the sensor based on the estimated location(s) of any static element(s). An advantage with the present embodiment is that the configuration unit may configure the sensor with respect to the location of a static element without the influence of any detection of moving targets, which may cause interference or noise. Indeed, the configuration is advantageously performed during a quiet period wherein no measurements are performed by the sensor.

According to an embodiment of the present invention, there is provided a sensor for presence detection of a target, comprising at least one transmitter, a plurality of receivers and a configuration unit as defined in any one of the above embodiments, the sensor being adapted to estimate (during a measurement session) the position of a target based on a probing signal transmitted from the transmitter and a return signal received by the plurality of receivers. For presence detection of a target, the sensor may be configured by the configuration unit based on the estimated location(s) of static element(s) in accordance with any one of the above mentioned embodiments. Hence, the present embodiment is advantageous in that the configured sensor provides an improved presence detection of a target as compared to other prior art systems. As the configuration unit can configure the sensor with respect to the estimated location(s) of static element(s) automatically, presence detection of a target by the sensor is improved. In particular, the sensor may be configured with respect to parameters such as the direction(s) of the probing signal, a transmitting range of the transmitter, boundary estimation of a zone in which the sensor is to operate, and/or threshold determination for the return signal, as described in the embodiments in connection to the configuration unit. Thus, during a measurement session, the performance of the presence detection sensor is improved thanks to the configuration.

According to an embodiment of the present invention, there is provided a lighting control system for controlling a lighting function of a light source, comprising a sensor as defined in the preceding embodiment, wherein the lighting control system is adapted to control the lighting function based on the location of a target estimated by the sensor. An advantage with the present embodiment is that it provides a lighting control system with improved energy efficiency as compared to other prior art systems. As the sensor can estimate the location of a target, the lighting control system may control a lighting function of a light source such that more or less light is provided at the estimated location of the target. Hence, a more location specific lighting may be provided, whereas lighting in areas which are not used may be avoided, thereby impeding energy waste.

For example, if the sensor estimates a person to be close to a piece of furniture in a room, the lighting control system may provide light by means of the light source to that specific piece of furniture for practical and/or aesthetic purposes. Furthermore, a person estimated to be present at a location close to where products or other items are positioned, e.g. shelves in a store or paintings in a museum, the lighting control system may control the light source at this position based on the estimated location of the person. In this way, the lighting function makes the person attentive to the position lit up by the light source. Alternatively, the lighting control system may be configured to decrease the lighting of the light source at the location wherein the person is estimated to be present, and increase the lighting of another light source at a position to which it is desirable that the person is re-oriented.

Moreover, the lighting control system may control the lighting function of the light source to achieve uniform lighting at locations wherein the target is estimated to be present. Analogously, in areas where the target is expected not to be present, the sensor may be configured to set a minimal, or at least reduced or relatively low, lighting of the light source in order to save energy. The terms "uniform lighting" should be construed as a lighting in which variations in illumination intensity is below a certain threshold.

According to an embodiment of the present invention, the sensor may be further adapted to estimate the location and the velocity of the target such that a trajectory of the target is estimated as a function of time. Hence, in this embodiment of the invention, the sensor is adapted to estimate both the location of the target e.g. in two dimensions, e.g. $x_1$, $y_1$, and the velocity of the target in two dimensions, e.g. $v_x$, $v_y$, such that a trajectory of the target may be estimated as a function of time. The present embodiment is advantageous with respect to energy efficiency of the lighting control system. Based on the estimated trajectory of the target, the lighting control system may adapt the lighting of the light source such that a desired lighting is provided along the trajectory. Furthermore, the control of the lighting function of the light source may in advance "light up" the estimated trajectory of a target, e.g. a person. Another advantage of the present embodiment is that the person may turn his attention to areas provided with light by the light source based on the estimated trajectory of the person. For example, a light source in a store may emit light to an area wherein a product is placed, such that a person, whose estimated location is predicted to be in a vicinity of the area, turns his attention to the product on which the light source emits light.

The lighting control system is suitable for indoor and outdoor applications. For example, dimming of neighboring light sources may be controlled depending on the estimated trajectory of the target.

It will be appreciated that the specific embodiments and any additional features described above with reference to the configuration unit are likewise applicable and combinable with the method according to the second aspect of the present invention, and the computer program product according to the third aspect of the present invention.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF THE EMBODIMENTS

In the following description, the present invention is described with reference to a configuration unit for configuring a sensor comprising a transmitter and a plurality of receivers.

Figure 1:
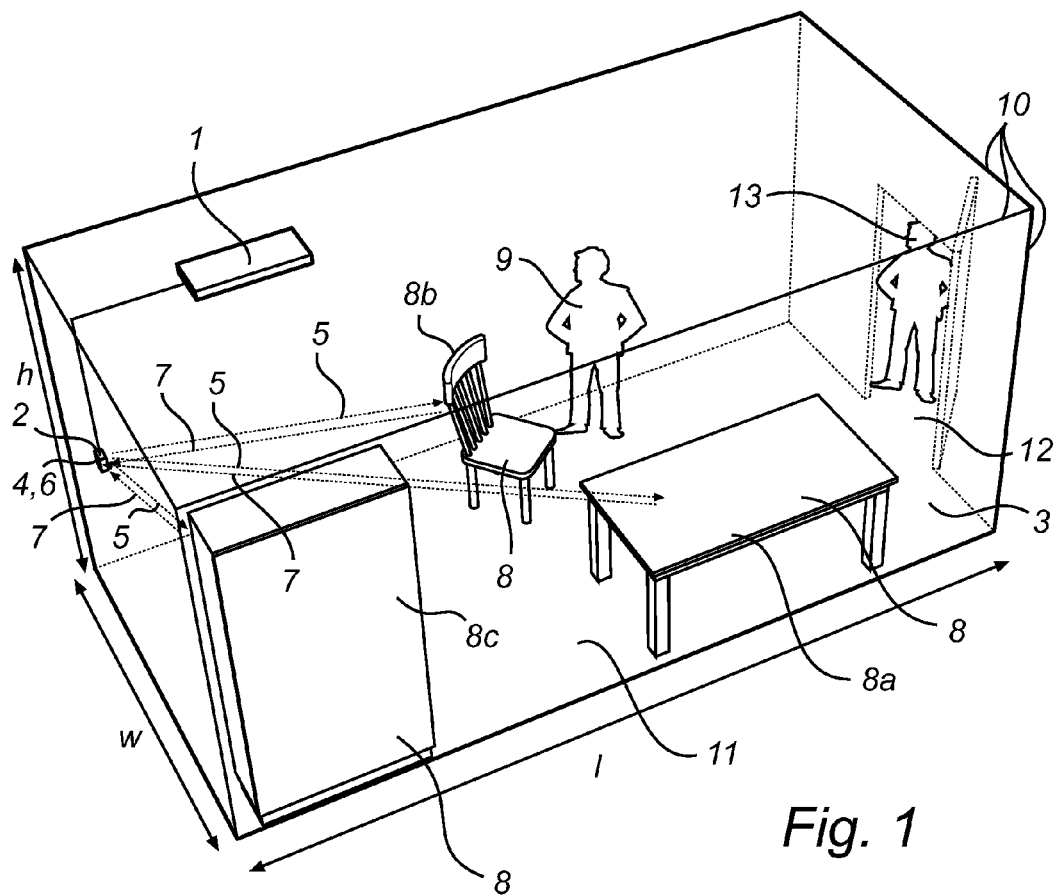
FIG. 1 is a schematic illustration of a configuration unit for configuring a sensor in accordance with an embodiment of the present invention.

FIG. 1 is a schematic illustration of a configuration unit 1 for configuring a sensor 2, wherein the sensor 2 is positioned on a wall in a room 3 with length 1, width w and height h. The sensor 2 comprises a transmitter 4 for transmitting a probing signal or probing signals 5, and a plurality of receivers 6. Alternatively, the transmitter 4 and the plurality of receivers 6 may be separate entities. For example, the probing signal 5 may be a sinusoid ultrasound signal, with a frequency of about $f_C$=40 kHz. It will however be appreciated that other signal waveforms and other frequencies may be used.

The plurality of receivers 6 may be arranged in a linear, rectangular, triangular or circular array, or alternatively, any other irregular array geometry. For example, the plurality of receivers 6 may be spaced equally in a linear array e.g. on a wall of the room 3, wherein a separation between two adjacent receivers 6 may be provided such that no grating lobes are observed.

The probing signal 5 from the transmitter 4 may be reflected against a static element 8, resulting in a return signal 7 which is received by the plurality of receivers 6. Here, the probing signal 5 is reflected on a plurality of static elements 8, schematically depicted as a desk 8a, a chair 8b, and a book shelf 8c, positioned within the room 3. The plurality of receivers 6 may be arranged at a height which normally is above the static elements 8.

The configuration unit 1 is operatively connected to the transmitter 4 and the plurality of receivers 6 and is adapted to estimate the location(s) of the static element(s) 8. The estimated location is based on the return signal 7 which corresponds to the reflective part of the probing signal 5 against a static element 8. Furthermore, the configuration unit 1 is adapted to configure the sensor 2, for presence detection of a target 9, based on the estimated location of the static element 8. In FIG. 1, the target 9 is schematically depicted as a person, who is positioned approximately in the middle of the room 3.

The configuration unit 1 may be adapted to configure the sensor 2 by determining the direction of the probing signal 5 or a transmitting range of the transmitter 4. The configuration unit 1 may configure the sensor 2 for an effective measurement session by adapting the direction of the probing signal 5 or a transmitting range of the transmitter 4 with respect to the location(s) of the static element(s) 8. For example, a region behind the book shelf 8c may not be accessible for the probing signal 5, as book shelf 8c casts a "shadow" behind the book shelf 8c. In such a case, the configuration unit 1 may configure the sensor 2 not to transmit a probing signal 5 in that direction in order to improve the efficiency of a later presence detection of a target 9 during a measurement session of the sensor 2.

The configuration unit 1 may for instance be adapted to configure the sensor 2 by turning the transmitter 4 in a horizontal direction, thereby changing the transmitting range of the transmitter 4. For example, the sensor may be turned such that the transmitting range is changed from e.g. a right portion of the room 3 to a left portion of the room 3. Furthermore, the transmitter may be turned in a vertical direction. For example, the transmitting range may be changed from e.g. an area with a focus on a portion of a room 3 far away from the transmitter 4, to a portion of the room 3 close to the transmitter 4, by vertically rotating the transmitter 4 downwards. Furthermore, the configuration unit 1 may be adapted to configure the sensor 2 in a direction or directions of the probing signal 5 (or a transmitting range of the transmitter 4) to areas and/or passages, e.g. passages between the static elements 8 and/or areas e.g. in front of the book shelf 8c, etc., wherein the possibility of presence detection of a target 9 in a measurement session such as a person may be higher as compared to other areas.

The configuration unit 1 may further be adapted to configure the sensor 2 by determining the transmitting power of the probing signal 5. For example, if the direction from the sensor 2 towards the book shelf 8c is considered to have a lower priority compared to a direction from the sensor 2 towards the desk 8a and/or the chair 8b, the transmitting power may be reduced or even extinct in the direction of the book shelf 8c.

The configuration unit 1 may be further adapted to configure the sensor 2 by determining boundaries 10 of a zone 11 defined by the estimated locations of a number of static elements 8. In FIG. 1, the zone 11 may be a floor area of the room 3, or the entire room 3 itself. For example, the walls 10 of the room 3 may here be the static elements, and the walls 10 may constitute the boundaries 10 of the zone 11. The size of the zone 11 may be determined by the configuration unit 1 for configuring the transmitting range of the transmitter 4. By determining the size of a zone 11 such as a room 3, the configuration unit 1 may configure the sensor 2 to exclude an area such as an area 12 outside the room 3, attainable e.g. by an open door and/or a window. Limiting the size of the detection zone reduces the risk of false alarm, as e.g. a person 13 present in the excluded area 12 could otherwise lead to presence detection during a measurement session. Alternatively, the configuration unit 1 may determine a size of the zone 11 within the room 3 comprising, or defined by, static elements 8, such as the desk 8a, chair 8b and/or the book shelf 8c. Furthermore, the configuration unit 1 may be adapted to determine the size of the zone 11 with respect to the feasibility and/or probability of a presence detection of a target 9 in that zone 11 during a measurement session.

Figure 2:
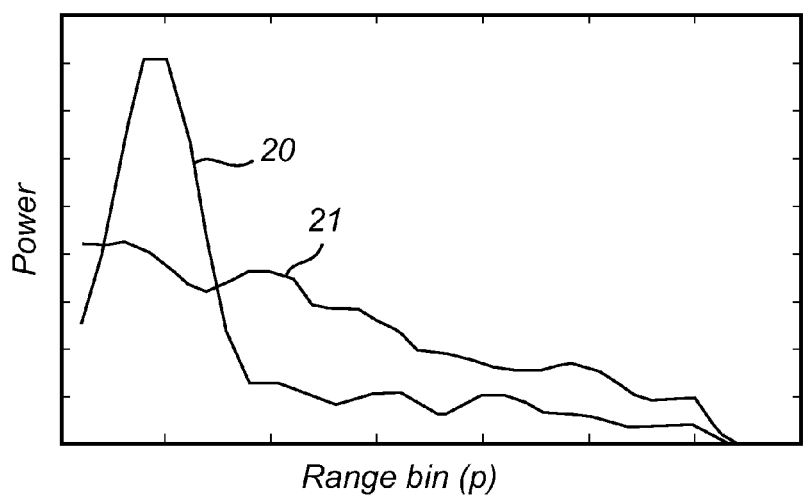
FIG. 2 is a diagram of a received power and a threshold for configuration of a presence detection sensor in accordance with an embodiment of the present invention.

FIG. 2 shows a received power 20 of a return signal 7 as a function of distance from the transmitter 4. During known quiet periods, i.e. during stationary conditions when there are no moving targets 9 within the room 3, a signal power may be computed based on the difference of the return signals 7 obtained from consecutive signal pulses at various range bins and direction-of-arrival angles. Generally, the difference of two consecutive signal pulses during quiet periods is equal to the contribution of noise plus interference of both pulses. However, in practice, the difference may also contain residual signals of the return signals 7 coming from static elements. In FIG. 2, the received power 20 shows a sharp peak for smaller distances, whereas for larger distances, the received power 20 is relatively low. A threshold 21 as a function of distance from the transmitter 4 is also shown in FIG. 2, wherein the threshold 21 decreases for larger distances. The peak of the received power 20 is above the threshold 21 for smaller distances, whereas the threshold 21 is above the received power 20 for larger distances.

If the received power 20 of the return signal 7 is measured to be below the threshold 21 determined by the configuration unit 1, as depicted for larger distances, the sensor 2 may be configured with respect to a low possibility, or no possibility at all, that there is a static element 8 present in the direction of the corresponding probing signal 5 or transmitting range of the transmitter 4. In contrast, if the received power 20 of the return signal 7 is measured to be above the threshold 21, as shown for smaller distances, the sensor 2 may be configured with respect to the information that a static element 8 is present in the direction of the corresponding probing signal 5 or transmitting range of the transmitter 4.

Alternatively, the configuration unit 1 may determine a threshold based on noise levels measured in the return signal 7 for the determination of a detected element being static or not. For example, if the Doppler effect is applied by the configuration unit 1 in the determination of a detected element being in motion or being stationary, a static element 8 may instead be construed as a moving element, i.e. a target 9, due to occurring noise. In the embodiment of the present invention, the configuration unit 1 may determine a threshold 21 based on noise levels in the return signal 7, such that the configuration unit 1 may separate a static element 8 from a target 9 based on a relation between the threshold and the return signal 7.

Figure 3:
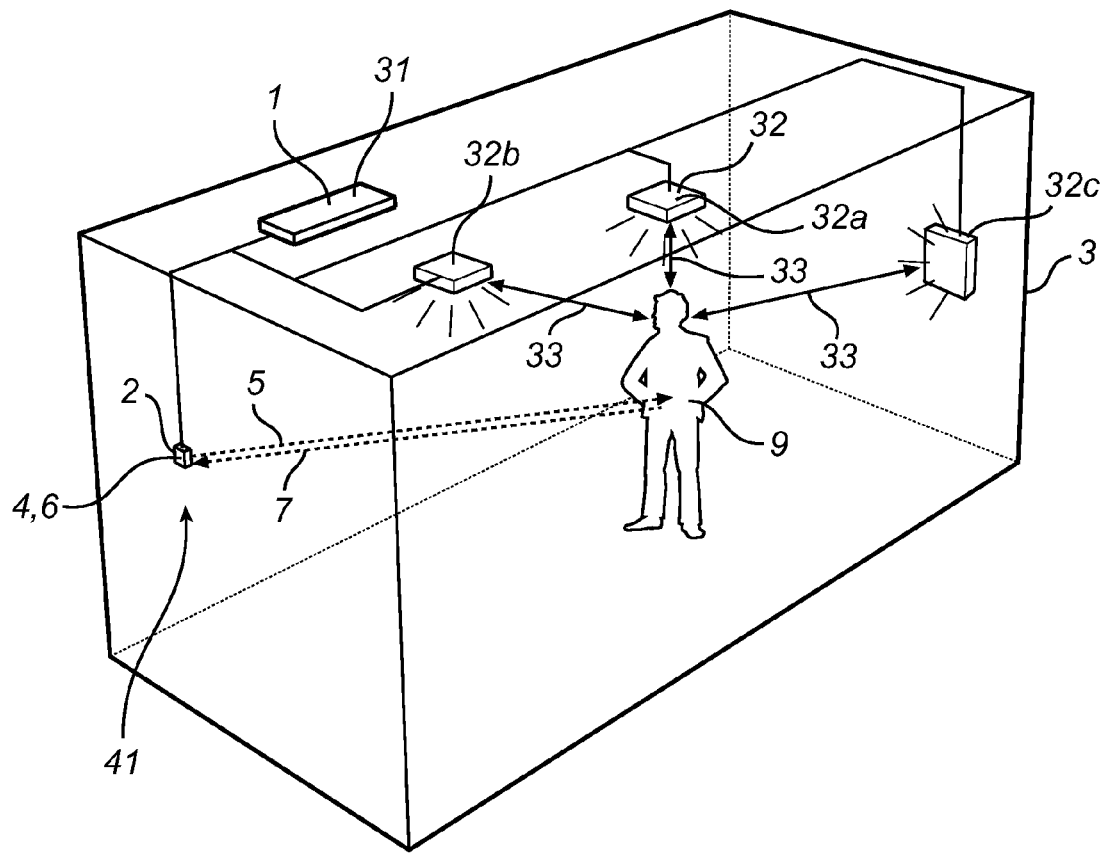
FIG. 3 is a schematic illustration of a configuration unit for configuring a sensor, a sensor for presence detection of a target, and a lighting control system in accordance with embodiments of the present invention.

In FIG. 3, the configuration unit 1 comprises receiving means 31 for receiving information relating to the position of devices 32, shown in the figure as three light sources 32a, 32b and 32c which are operatively connected to the sensor 2. The configuration unit 1 is adapted to configure the sensor 2 for relative localization of the target 9 with respect to the plurality of light sources 32. If the target 9, e.g. a person, is estimated to be located at a location in the room 3, the light sources 32a, 32b and/or 32c may be turned on such that light is provided to that location of the room 3. The location may be close to e.g. a desk, a book shelf, or a chair, where the person 9 is located, and the control of the light source may improve the lighting for the person 9 who e.g. will study at the desk or find a book in the book shelf.

Furthermore, the sensor 2 in FIG. 3 may be provided for presence detection of a target 9, wherein the sensor 2 comprises a transmitter 4, a plurality of receivers 6 and a configuration unit 1. The sensor 2 is adapted to estimate the position of a target 9 based on a probing signal 5 transmitted from the transmitter 4 and a return signal 7 received by the plurality of receivers 6.

A lighting control system 41 is schematically shown in FIG. 3 for controlling a lighting function of the light source(s) 32. The lighting control system 41 comprises a sensor 2, wherein the lighting control system 41 is adapted to control the lighting function based on the location of the target 9 estimated by the sensor 2. For example, the lighting control system 41 may be adapted to control the lighting function of the light source(s) 32 with respect to the distance 33 between the light source(s) 32 and the target 9. For example, if a person 9 is estimated by the sensor 2 to be located at a location close to the light source 32a, but further away from the light sources 32b and 32c, as shown in the FIG. 3, the light source 32a may have a high light intensity, whereas the light sources 32b and 32c may have a lower light intensity.

Figure 4:
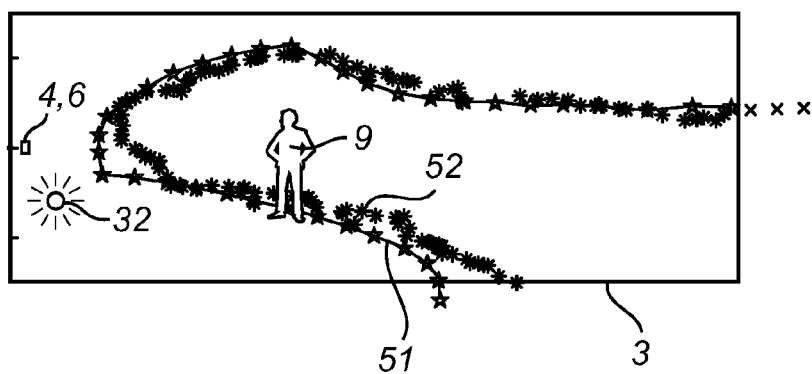
FIG. 4 is a view of a trajectory of a target obtained by a sensor in accordance with an embodiment of the present invention.

FIG. 4 is a view of a trajectory 51, e.g. a path, a route or a way, of a target 9 in a room 3. The trajectory 51 of the target 9 is estimated as a function of time. Hence, it is here meant that the target 9, estimated at e.g. the location $x_1$, $y_1$ at time $t_1$, is estimated to be at e.g. $x_2$, $y_2$ at time $t_2$, and further at e.g. $x_3$, $y_3$ at time $t_3$, etc.

A sensor 2, comprising a transmitter 4 and a plurality of receivers 6, is located on the middle of the wall at the left hand side of the room 3. Close to the sensor 2 is provided a light source 32.

As shown by the trajectory 51 marked by a number of stars, the target 9, depicted as a person, enters the room 3 from approximately the middle of the long side of the room 3, and then turns left and walks to the left side of the room 3 towards the short end of the room 3. From there, the target 9 turns right and walks along the long side of the room 3 opposite the long side from which the person entered the room 3. The target 9 then exits the room 3 at the right side of the room 3.

As the sensor 2 is configured to estimate the location and the velocity of the target 9 in the room 3, a trajectory 52 of the target 9 (within this room 3) can be effectively estimated as a function of time. The result of such an experiment is shown in FIG. 4, wherein the estimated trajectory 52, shown as a number of asterisks, closely follows the real trajectory 51 of the target 9 in the room 3.

The light source 32 may be controlled such that if the target 9 is estimated by the sensor 2 to be present at e.g. $x_1, y_1$ at time $t_1$ and at e.g. $x_2, y_2$ at time $t_2$, wherein the positions are comprised in the estimated trajectory of the target, a light source 32 relatively close to the coordinates $x_1, y_1$ may be turned "on" at time $t_1$, or at a time close to $t_1$, and/or a light source 32 relatively close to the coordinates $x_2, y_2$ may be turned "on" at time $t_2$, or at a time close to $t_2$. Analogously, the lighting of the respective light sources 32 may be turned "off" when the target 9 is relatively distant from the estimated locations $x_1, y_1$ at time $t_1$ and at e.g. $x_2, y_2$ at time $t_2$. For example, when the target 9 enters the room 3, the light source 32 may be turned "on". Alternatively, the light source 32 may be turned "on" as the target 9 moves in the direction of the light source 32. Analogously, the light source 32 may be turned "off" when the target 9 leaves the room 3.

Figure 5:
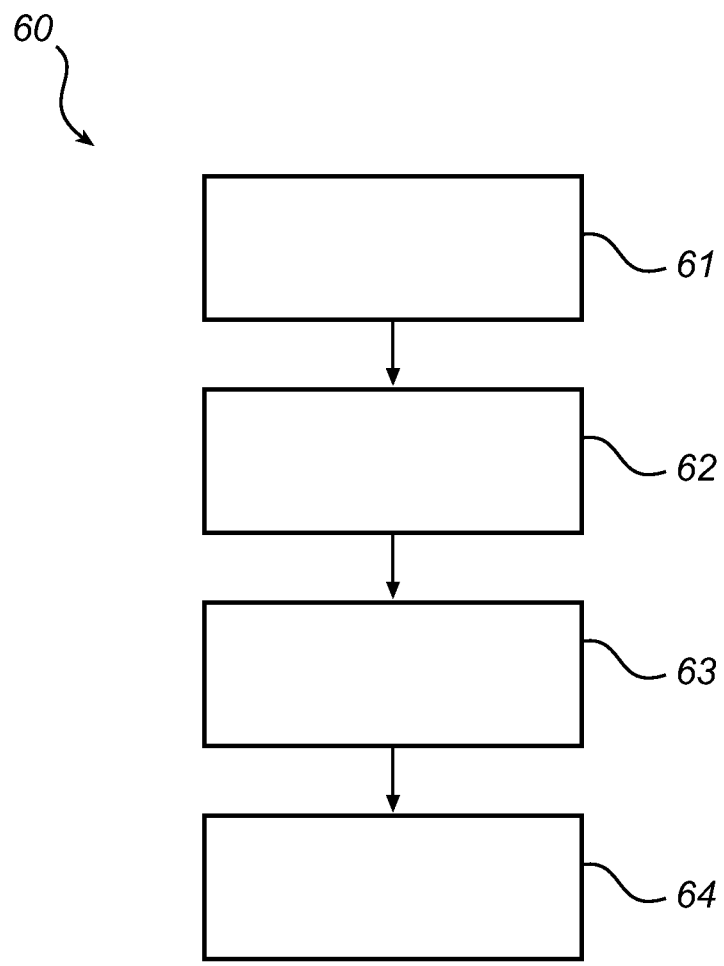
FIG. 5 is a schematic block diagram of the method for configuring a sensor in accordance with an embodiment of the present invention.

FIG. 5 is a schematic block diagram of a method 60 for configuring a sensor. The method 60 comprises the steps of transmitting 61 a probing signal and receiving 62 a return signal, wherein the return signal is generated by reflection of the probing signal against a static element. Furthermore, the method 60 comprises the step of estimating 63 the location of the static element based on the return signal, and configuring 64 the sensor, for presence detection of a target, in accordance with the estimated location of the static element.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

For example, although a sensor comprising one transmitter has been described, it is envisaged that the sensor may comprise a plurality of transmitters.

For example, the static element(s) 8 may be any kind of furniture, objects, or walls than those pieces of furniture depicted. Furthermore, the number of the static elements 8, as well as the sizes of the static elements 8, may vary.

It will also be appreciated that, although configuration of the sensor by the configuration unit and in accordance with the method of the present invention may be advantageously performed at installation of the sensor, the configuration session may be performed at any time, even after installation of the sensor. Thus, the configuration unit (or the sensor itself) may be configured to perform a configuration session of the sensor at predetermined time intervals in order to provide an updated configuration. Such an implementation is advantageous since the environment around the sensor might have changed (furniture may be displaced) since the installation.

Further, it will be appreciated that the configuration session may be performed with or without presence of targets (i.e. moving sensors) in the intended field of detection of the sensor.

Further, although FIG. 2 shows the received power as a function of distance from the transmitter, the analysis of the return signals may be performed with respect to an angle of the return signal form the boresight of the receiver array (or plurality of receivers), i.e. the normal to the receiver array.

Further, although in some of the above examples it has been described that the sensor is an ultrasound sensor, it will be appreciated that the present invention may be applied to other types of sensors such as e.g. a radio frequency sensor. In general, the present invention may be applied to various active sensor modalities such as radio frequency sensor modalities or ultrasound sensor modalities. Further, it will be appreciated that an active sensor may be a sensor comprising a transmitting part (with at least one transmitter) and a receiving part (with a plurality of receivers).

The invention claimed is:

1. A configuration unit for configuring a sensor comprising at least one transmitter and a plurality of receivers, said configuration unit being operatively connected to said at least one transmitter and said plurality of receivers and being adapted to:
   estimate the location of at least one static element based on at least one probing signal transmitted by said at least one transmitter and based on at least one return signal received by said plurality of receivers, wherein said at least one return signal is generated by reflection of said at least one probing signal against said at least one static element; and
   configure said sensor, for presence detection of a target, based on the estimated location of said at least one static element, wherein based on the estimate location of the at least one static element, the configuration unit is adapted to configure the sensor such that the direction of the probing signal is adjusted to cover a first region or a second region such that advantageous probing directions are selected.

2. A configuration unit as claimed in claim 1, being adapted to configure said sensor by determining the transmitting power of said at least one probing signal.

3. A configuration unit as claimed in claim 1, being adapted to configure said sensor by determining boundaries of a zone defined by the estimated locations of a number of static elements.

4. A configuration unit as claimed in claim 2, being adapted to determine the size of said zone for configuring the transmitting range of said transmitter.

5. A configuration unit as claimed in claim 1, being adapted to configure said sensor by determining at least one threshold for a return signal to be obtained during a measurement session by said sensor based on noise levels measured in said at least one return signal.

6. A configuration unit as claimed in claim 1, being adapted to estimate the location of said at least one static element based on the time-of-flight of said at least one probing signal and said at least one return signal.

7. A configuration unit as claimed in claim 1, being adapted to estimate the location of said at least one static element by subtracting two return signals obtained in response to two consecutive similar pulses transmitted from said transmitter.

8. A configuration unit as claimed in claim 1, further comprising receiving means for receiving information relating to the position of at least one device operatively connected to said sensor, said configuration unit being adapted to configure said sensor for relative localization of said target with respect to said device using said information.

9. A configuration unit as claimed in claim 1, being adapted to determine if said sensor is inactive with respect to presence detection of said target for initiating estimation of the location of said at least one static element.

10. A sensor for presence detection of a target, the sensor comprising at a least one transmitter and a plurality of receivers and a configuration unit as defined in claim 1, said sensor being adapted to estimate, during a measurement session, the location of at least one target based on at least one probing signal transmitted from said at least one transmitter and at least one return signal received by said plurality of receivers.

11. A system as claimed in claim 10, being a lighting control system for controlling a lighting function of at least one light source, comprising a sensor as claimed in claim 10, wherein said lighting control system is adapted to control the lighting function based on the location of said target estimated by said sensor.

12. A lighting control system as claimed in claim 11, wherein said sensor is further adapted to estimate the location and the velocity of said target such that a trajectory of said target is estimated as a function of time.

13. A method for configuring a sensor, comprising the steps of:
- transmitting at least one probing signal;
- receiving at least one return signal, said at least one return signal being generated by reflection of said at least one probing signal against at least one static element;
- estimating the location of said at least one static element based on said at least one return signal; and
- configuring said sensor, for presence detection of a target, in accordance with the estimated location of said at least one static element, wherein based on the estimated location of the at least one static element, the sensor is configured such that the direction of the probing signal is adjusted to cover a first region or a second region so that advantageous probing directions are selected.

* * * * *